United States Patent [19]

Prows et al.

[11] Patent Number: 4,608,919
[45] Date of Patent: Sep. 2, 1986

[54] BURRITO MACHINE

[76] Inventors: Reed N. Prows, 19161 Aldora Dr.; William J. Nicholas, 2112 Camwood, both of Rowland Heights, Calif. 91748

[21] Appl. No.: 667,415

[22] Filed: Nov. 1, 1984

[51] Int. Cl.$^4$ .................. A21C 9/00; A21C 11/00
[52] U.S. Cl. .................. 99/450.6; 99/450.2; 99/450.7
[58] Field of Search .................. 99/450.1–450.6, 99/352–356, 450.7; 426/500–502, 297; 53/210, 211, 216, 465, 228, 229; 425/112, 117, 96, 324.1

[56] References Cited

U.S. PATENT DOCUMENTS

| | | | |
|---|---|---|---|
| 3,669,007 | 6/1972 | Pulici | 99/450.6 |
| 4,084,493 | 4/1978 | Quintana | 99/450.6 X |
| 4,393,758 | 7/1983 | Anmahian | 99/450.6 |
| 4,457,225 | 7/1984 | Bakker | 99/450.6 |
| 4,483,242 | 11/1984 | Goodman et al. | 99/450.6 |
| 4,516,487 | 5/1985 | Madison et al. | 99/450.6 |

Primary Examiner—Timothy F. Simone
Attorney, Agent, or Firm—Boniard I. Brown

[57] ABSTRACT

The machine includes a first horizontal moving belt onto which flat, flexible tortillas are placed. Burrito filling is placed thereon near the tortillas' leading edge. The leading edge of each tortilla contacts a first spinning transfer rod and a hinged plate at the end of the first belt. The plate folds the leading edge flap of the tortilla up and over the burrito filling and the rod transfers the partially formed burrito to a second horizontal moving belt. The second belt moves the partially formed burrito shell under a weighted curtain which presses the flap over the burrito filling. A second spinning transfer rod transfers the shell to a third moving belt which is narrower than a flat tortilla. Each tortilla then passes under creasing means which act downwardly against the tortilla and the third belt to crease the tortilla adjacent its side edges which are lifted by side ramps over a pair of spaced rods which slide in the creases so that the side ramps alternately fold the sides of the tortilla up and over the front flap. A plurality of transverse ridges on the third belt engage the underside of the shell, rolling it over and over against a spring loaded curtain to finish the burrito formation. An unloading station then transfers the burritos to a fourth belt for transport to packaging means.

24 Claims, 21 Drawing Figures

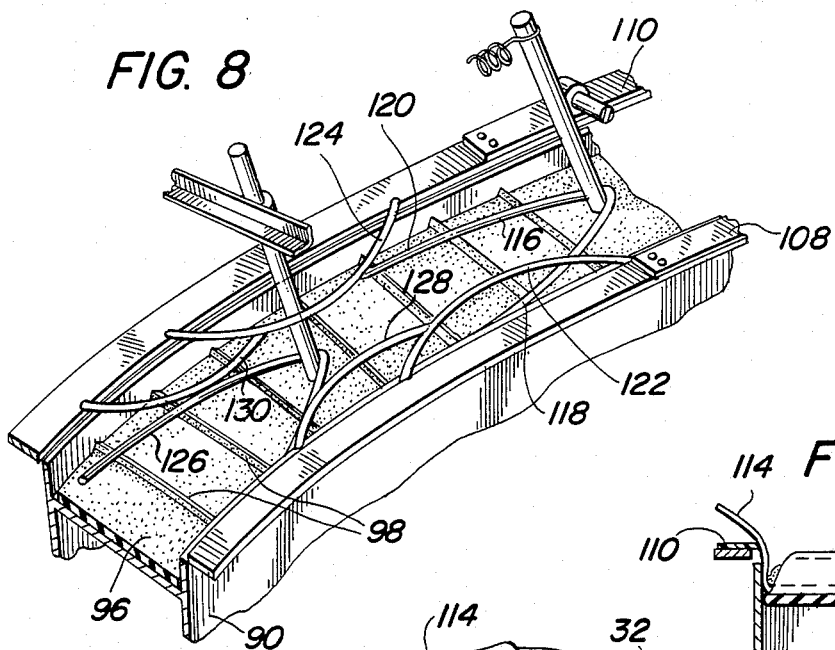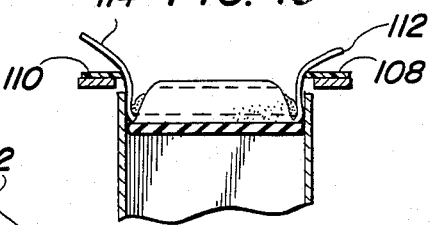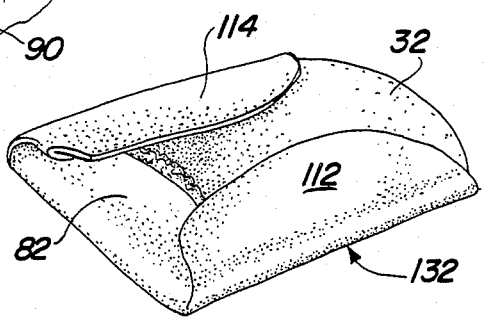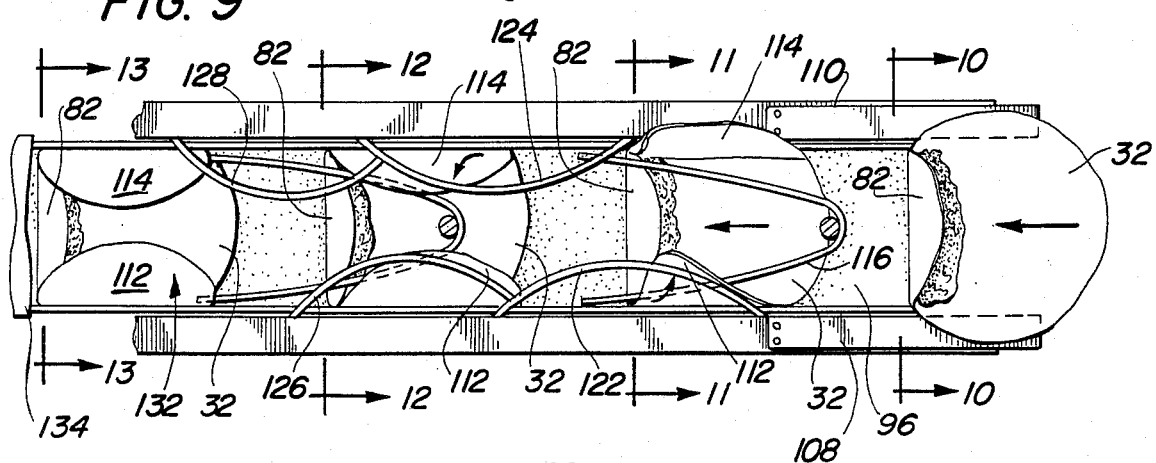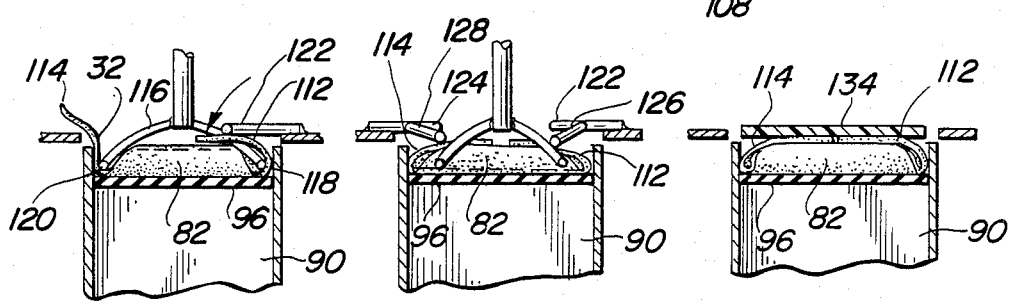

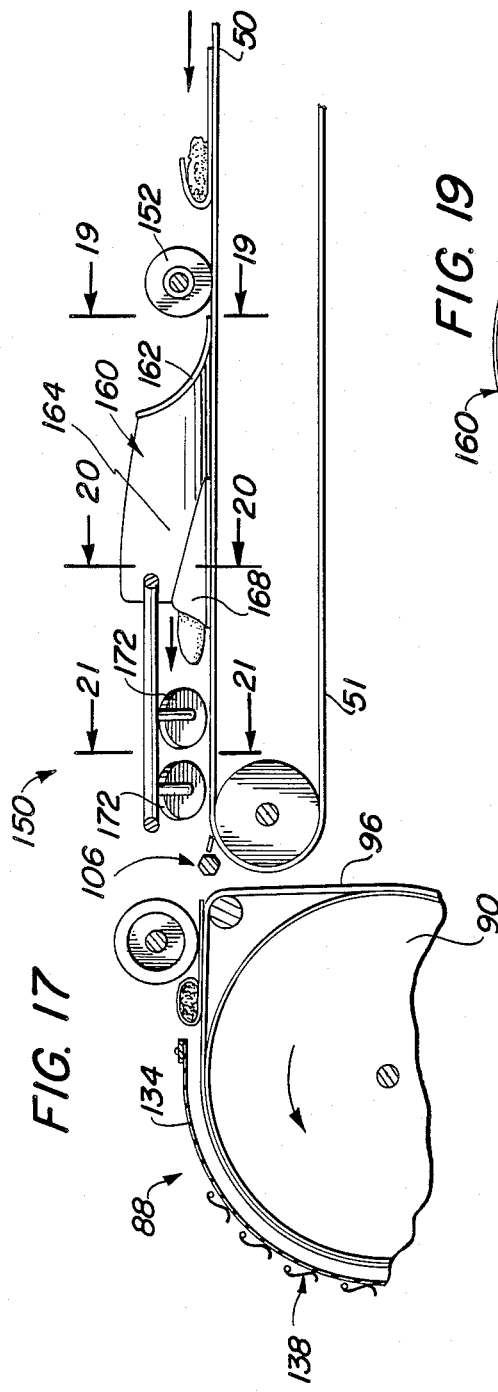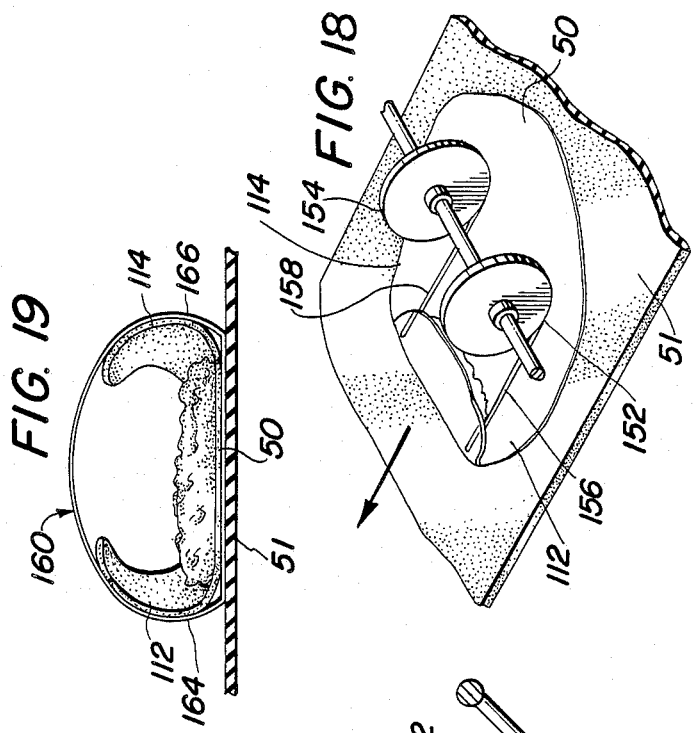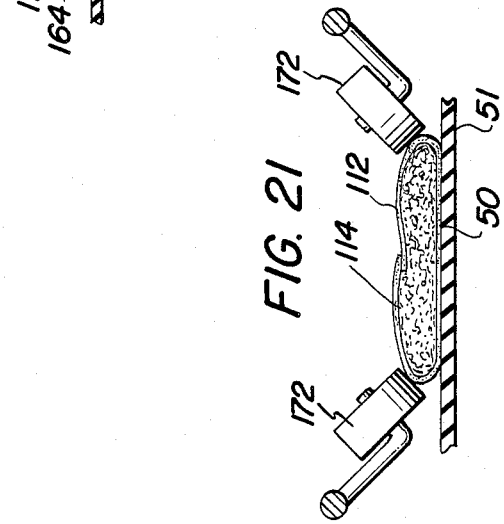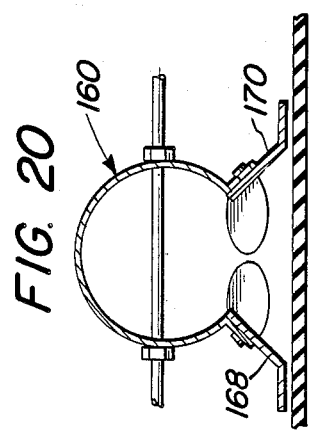

BURRITO MACHINE

BACKGROUND OF THE INVENTION

Burritos are a traditional Mexican food which are quite popular in the southern portion of the United States. They are formed by placing a filling of beans, meat, cheese and the like on a relatively large, flexible tortilla, folding an edge of the tortilla over the filling, folding the sides of the tortilla toward its center so that the filling cannot leak out and then rolling the remaining tortilla about the enclosed filling to form a convenient eatable package. Burritos can be prepared in advance of a meal because the tortilla provides a container for the more perishable filling as well as adding to the flavor. As burritos have become a more popular food item in the United States, there has been a need to eliminate the labor and quality control problems that accompany the manual filling and folding of burritos when the burritos are made in volume at remote factories and then packaged for sale at lunch trucks, restaurants, and grocery stores. Unfortunately, attempts to automate the burrito forming process have heretofore been unsuccessful primarily due to the nonuniform nature of tortillas and the different viscosities and other characteristics of the numerous filling materials. Therefore, there has been a need to develop a machine which can reliably form burritos from their constituent fillings and tortillas.

BRIEF DESCRIPTION OF THE PRESENT INVENTION

The present burrito machine includes a first horizontally moving belt onto which tortillas are manually or automatically fed as the belt moves. A burrito filling extruder is provided above the first belt to apply a transverse, linear mound of burrito filling onto the upper surface of each tortilla near its leading edge. Electric eyes or other suitable sensing devices can be used to time the extrusion of the filling material when manual belt loading methods are employed. Each tortilla with filling on the upper surface thereof is moved by the first belt to an unloader station where a second horizontal belt moving at about the same speed as the first belt is waiting. A first spinning rod is positioned between the two belts to transfer each tortilla from the first to the second. The rod has an uneven outer surface whose velocity is higher than the velocity of the first and second belts to assure transfer. The rod also guides the leading edge of each tortilla into a hinged transverse plate extending between the two belts whose lower edge is canted slightly toward the first belt. The leading edge of each tortilla rides up the hinged plate until the weight of the filling forces the plate to rotate out of the way toward the second belt to allow the undersurface of the tortilla to engage the second belt. The effect of the hinged plate is to fold a flap of tortilla up and over the burrito filling. The second belt immediately thereafter carries each partially formed burrito underneath a weighted curtain which presses the flap down on the filling to assure that it remains in its folded position over the burrito filling. A second spinning rod, similar to the first, transfers the partially formed burritos to a third moving belt. The third moving belt is narrower than the tortilla diameter and includes transverse ridges to assure that the tortillas do not slip thereon.

The third belt carries the partially formed burritos under creasing devices such as spring loaded parallel rods or wheels which are spaced apart to just clear the ends of the burrito filling and to form a pair of crease lines adjacent the sides of each tortilla just inside the edges of the third belt. At the same time, the sides of each tortilla engage upwardly sloping ramps which lift the sides. The ramps include staggered, inwardly facing slide bars which alternately fold the uplifted sides over the spaced parallel rods which thereafter slide out of the creases. The partially formed burritos thereafter are engaged by a pair of spaced parallel rods whose ends face in the direction of belt movement and which are positioned in the creases. At that point, the filling is completely covered by tortilla, first by the leading edge flap and then by the folded sides. The third belt then moves the partially formed burritos under a spring loaded curtain which engages the upper surfaces thereof to roll the tortilla around the filling. The length of the curtain is chosen to assure that each burrito rolls more than normally necessary so that a burrito is completely rolled even if its tortilla is oversize or some slippage has occurred.

It is therefore an object of the present invention to provide an automated burrito forming machine.

Another object of the present invention is to provide a burrito forming machine which can be constructed relatively economically and which requires careful attention to detail to manufacture, but little exotic technology.

Another object is to provide a burrito forming machine which is easily cleanable and maintainable.

Another object is to provide a machine which invariably forms acceptable burritos from nonuniform components.

These and other objects and advantages of the present invention will become apparent to those skilled in the art after considering the following detailed specification together with the accompanying drawings wherein:

DETAILED DESCRIPTION OF THE DRAWINGS

FIG. 8 is a top perspective view showing the folding ramps and creasing rods of FIG. 7;

FIG. 9 is a top view of the mechanism of FIG. 7 showing the folding ramps and rods operating to fold the sides of burritos;

FIG. 10 is a cross-sectional view taken at line 10—10 in FIG. 9;

FIG. 11 is a cross-sectional view taken at line 11—11 in FIG. 9;

FIG. 12 is a cross-sectional view taken at line 12—12 in FIG. 9;

FIG. 13 is a cross-sectional view taken at line 13—13 in FIG. 9;

FIG. 14 is a perspective view of a partially completed burrito after it has formed as shown in FIGS. 10 through 13;

FIG. 17 is a side elevational view of a burrito forming machine constructed according to the present invention having a modified side folding mechanism;

FIG. 18 is an enlarged perspective view of a pair of creasing wheels employed in the machine of FIG. 17;

FIG. 19 is a cross-sectional view taken at line 19—19 of FIG. 17, showing a shell type side folding member;

FIG. 20 is a cross-sectional view taken at line 20—20 of FIG. 17, showing the shell type side folding member as it is completing the side folding operation; and FIG. 21 is a cross-sectional view taken at line 21—21 of FIG. 17, showing a partially formed but folded burrito passing between side shaping wheels.

DETAILED DESCRIPTION OF THE SHOWN EMBODIMENTS

Figures 1, 2:
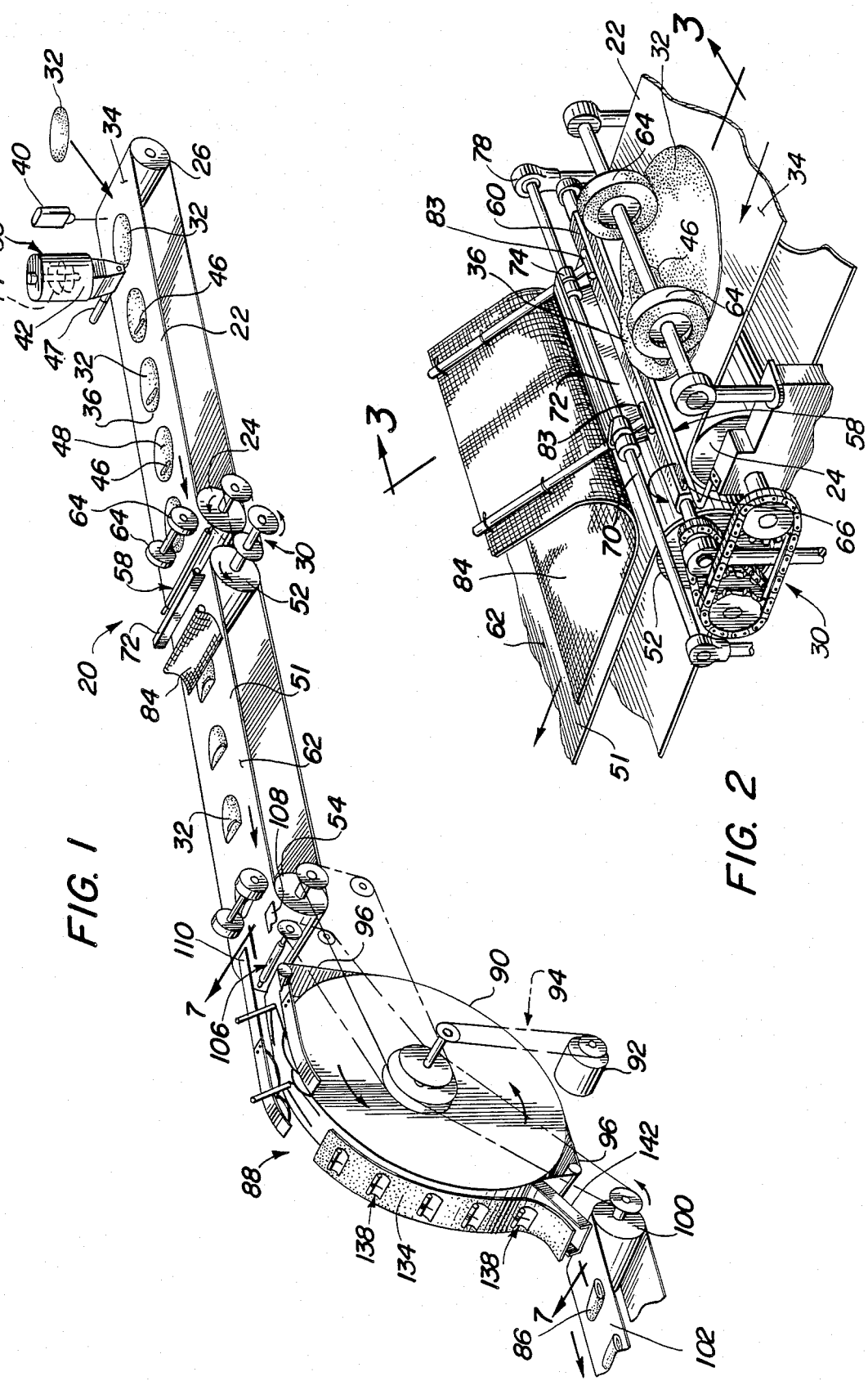
FIG. 1 is a perspective view of the present burrito forming machine.
FIG. 2 is an enlarged detail perspective view of the first to second belt transfer and first flap folding mechanism of the present machine.

Referring to the drawings more particularly by reference numbers, number 20 in FIG. 1 refers to a burrito machine constructed according to the present invention. The machine 20 includes a first flat belt 22 which is driven horizontally between a pair of rollers 24 and 26 by suitable means such as the chain drive mechanism 30, shown. Tortillas 32 are placed on the upper surface 34 of the belt 22 by suitable means (not shown) which may be manual or automatic.

Tortillas 32 are a particularly difficult food item to handle since traditionally they are relatively nonuniform. If material handling considerations were paramount, the tortillas would be circular in shape with an uniform cross-section. However, such perfectly formed tortillas lose a certain air of authenticity when beheld by a potential buyer and therefore a nonuniform nature is desirable.

Once a tortilla 32 is placed on the upper surface 34 of the belt 22, the position of its leading edge 36 with respect to a burrito filling extruder 38 must be determined. This can be accomplished by an electric eye assembly 40 which is able to distinguish the relatively light tortilla from a darker belt 22, or by manual means. As shown, the burrito filling extruder 38 includes a filling container 42 which normally contains a burrito filling mixture. A screw mechanism 44 forces the burrito filling 46 out through a valve 47 so that the filling 46 falls vertically onto the upper surface 48 of each tortilla 32. The filling 46 is provided in a pile 49 which has a transverse linear nature and is spaced adjacent the leading edge 36 of its tortilla 32.

Figure 3:
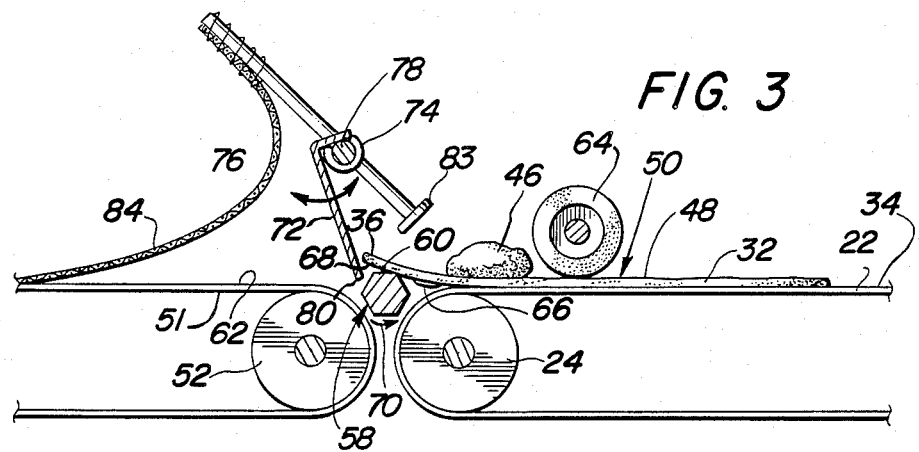
FIGS. 3, 4 and 5 are side diagrammatic views of the portion of the machine shown in FIG. 2, illustrating how the leading edge flap for a burrito is folded and formed.
Figure 4:
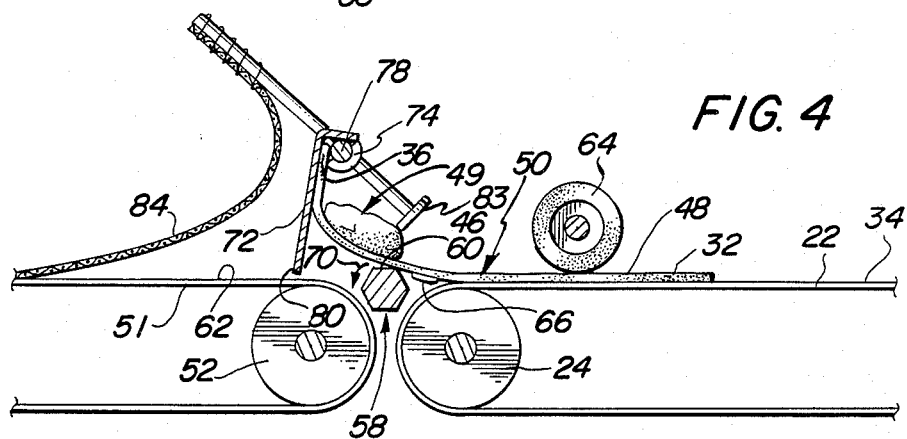
Figure 5:
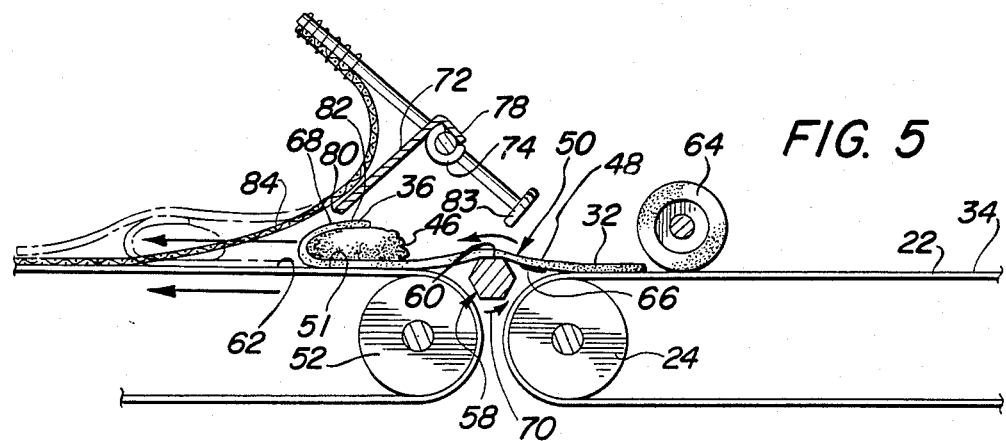

The first belt 22 transfers the partially formed burrito or shell 50 to a second belt 51, as shown in greater detail in FIGS. 2 through 5. The second belt 51 runs between two rollers 52 and 54 in the same general horizontal direction as the first belt 22 and at approximately the same speed by means of the chain drive 30 connected between roller 24 and 52. The drive 30 also rotates a transfer rod 58 which is positioned between the rollers 24 and 52 so that its upper outer surface 60 is in general alignment with the upper surfaces 34 and 62 of belts 22 and 51. When transferring, the leading edge 36 of a tortilla 32 first passes beneath a pair of wheels 64 driven by the belt 22 which assure that it does not slip on the belt 22. Then the leading edge 36 of each tortilla 32 rides up on the surface 60 of the transfer rod 58. A scraper blade 66 positioned between the roller 24 and the rod 58 lies flat on the moving belt 22 and assures that the leading edge 36 of each tortilla 32 and its filling 46 are guided properly to the transfer rod 58. The outer surface 60 of the transfer rod 58 has a hexagonal or other roughened shape to assure frictional contact with the underside 68 of the tortilla, as shown in FIG. 3. The transfer rod 58 is rotating in the direction shown by arrow 70 at a speed above that of either belts 22 or 51. It causes the leading edge 36 of each tortilla 32 to contact a transverse, inverted L shaped plate 72 which is connected by a transverse hinge 74 for pivotal motion in the directions of arrow 76 to a support structure 78. The plate 72 is formed and hinged so that it normally lies at a slight canted angle between the belts 22 and 51 with its lower edge 80 toward the first belt 22. This canting causes the leading edge 36 of each tortilla 32 to ride up the plate 72 toward the hinge 74 until the leading edge 36 contacts the hinge 74 and fails in column bending into a flap 82 which thereafter falls at least partially on top of the filling 46. The swing weight of the plate 72 is substantially less than the weight of the filling 46 so that as the filling 46 is driven over the rod 58, the plate 72 pivots out of the way as shown in FIG. 5 so that the burrito shell 50 can transfer to the second belt 51. The support structure 78 includes a pair of stops 83 which allow only limited forward rotation of the plate 72 so that it cannot accidentally flip over the leading edge 36 of the next tortilla 32. The structure 78 also supports a weighted curtain or screen 84 which frictionally engages the flap 82 and assures that the flap 82 is pressed into the filling 46 as the second belt 51 moves the shell 50 underneath the curtain 84.

Figure 6:
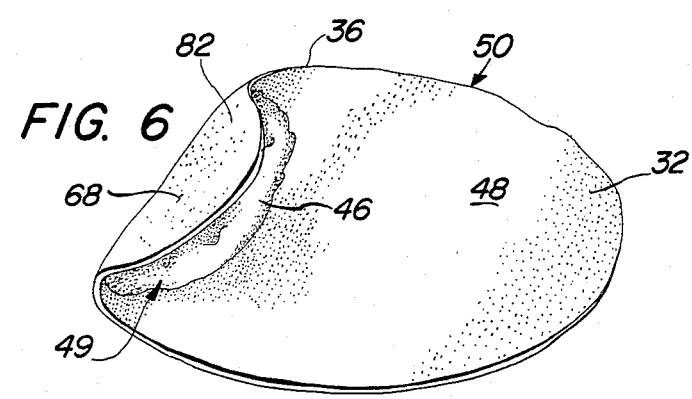
FIG. 6 is a perspective view of a partially formed burrito after it has formed as shown in FIGS. 3, 4, and 5.
Figure 7:
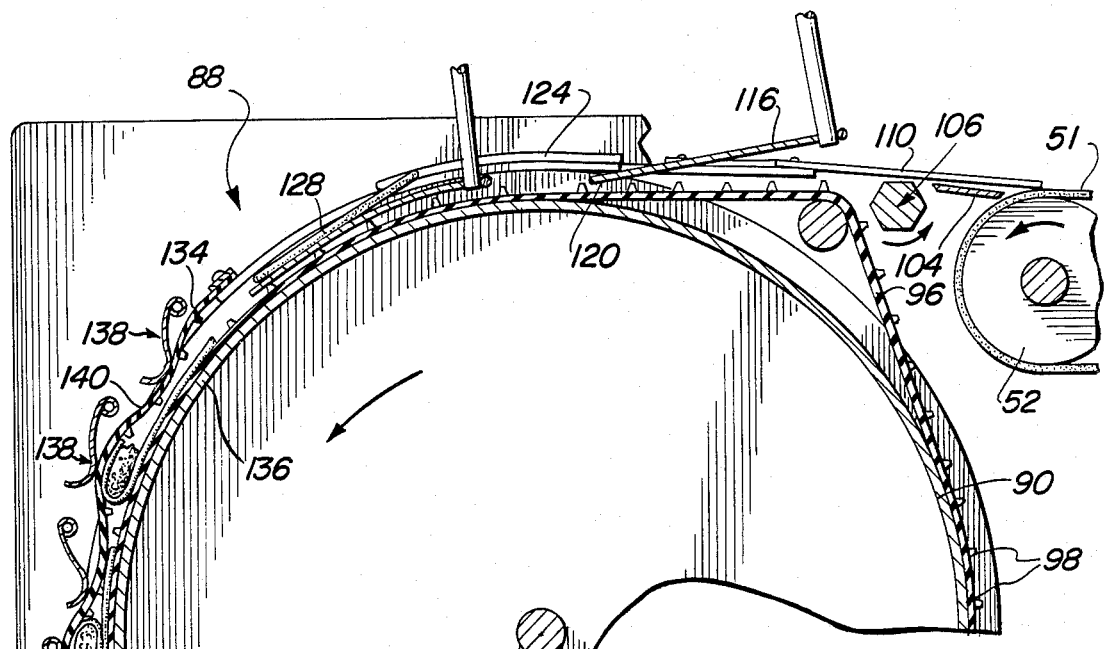
FIG. 7 is an enlarged partial cross-sectional view of the creasing, side folding, and rolling mechanism of the machine of FIG. 1.
Figure 15:
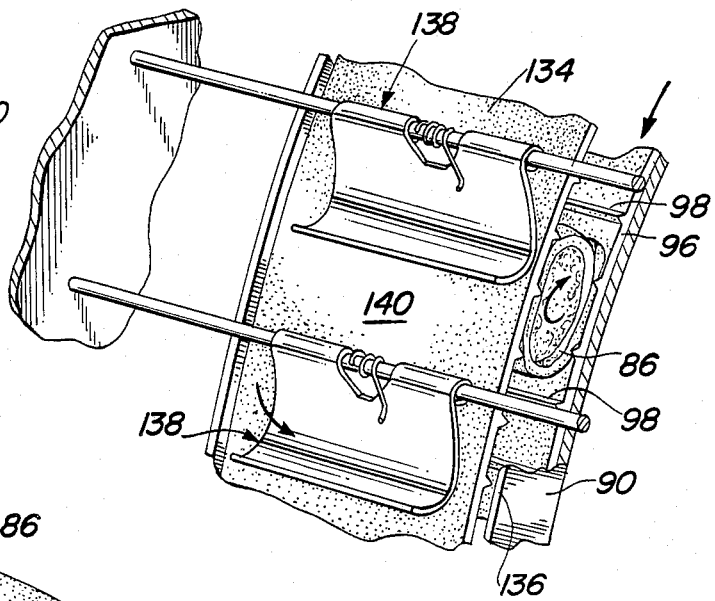
FIG. 15 is an enlarged perspective view of a portion of the rolling mechanism of FIG. 7.
Figure 16:
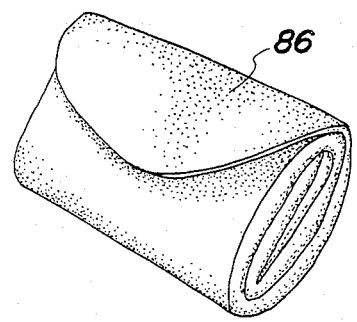
FIG. 16 is a perspective view of a completed burrito after it has been rolled as shown in FIGS. 7 and 15.

The final formation of the shells 50 as shown in FIG. 6 into completed burritos 86 (FIG. 16) occurs in the mechanism 88 shown in FIG. 7. The mechanism 88 includes a large diameter wheel 90 which as shown in FIG. 1 is driven by an electric motor 92 by means of a chain drive mechanism 94 which also drives the roller 54 and the first and second belts 22 and 51. A third belt 96 which is narrower than first and second belts 22 and 51 and has upstanding ridges 98 thereon to increase its friction with a forming burrito, is driven by the wheel 90. The drive mechanism 94 also drives another roller 100 about which a fourth belt 102 is driven.

Burrito shells 50 are transferred from the belt 51 to the belt 96 at a relatively flat portion 103 thereof by means of a scraper blade 104 and a rotating rod 106 positioned similarly to blade 66 and transfer rod 58. The transfer rod 106 causes the shell 50 to transfer to the belt 98 adjacent a small rotating shaft 107 which supports the belt 98 off of the wheel 90 to form the flat portion 103 thereof. The belt 98 is just wider than the final expected width of the burritos 86. As shown in FIGS. 7 and 8, ramps 108 and 110 are positioned on the opposite sides of the belt 98 so that the side flaps 112 and 114 of each tortilla 32 are lifted thereby, as shown in FIGS. 9 and 10. The shell 50 then passes under a spring-loaded V-shaped rod 116 whose outer generally parallel ends 118 and 120 bear down against each tortilla 32 to crease it as its flaps 112 and 114 are alternately folded thereover by inwardly extending slide bars 122 and 124. Each shell 50 then is carried underneath a second stationary V-shaped rod 126, similar to rod 116 except that it has some curvature to follow the curvature of the wheel 90, which assures perfect formation of the side flaps as second slide bars 128 and 130 assure the flaps 112 and 114 remain folded in the proper positions. The slide bars 128 and 130 bear down on top of the flaps 112 and 114 to flatten the almost completed burrito shells 132, one of which being shown in FIG. 14. These almost completed shells 132 then are carried down the wheel 90 by the belt 96 until they contact a curtain 134. The curtain 134 includes transverse ribs 136 to assure frictional contact with the shells 132. In addition, a plurality of spring-loaded members 138 press on the outer surface 140 of the curtain 134 to further assure good frictional contact. Then the moving belt 96 and the stationary curtain 134 cause the burrito shells 132 to roll as shown in FIG. 7, so that their tortilla 32 wraps around and around until no trailing edge flap is left unwrapped. At that point, as shown in FIG. 7, the completed burritos 86 contact a scraper plate 142 adjacent another flat portion 144 of the belt 96 formed between the wheel 90 and a second rotating shaft 146 which can also act as a belt tightener. The scraper plate 142 transfers the completed burritos 86 to the fourth belt 102 for transport to packaging means (not shown)

A modified embodiment 150 is shown in FIGS. 17 through 21 wherein the burrito shells 50 pass under a pair of wheels 152 and 154 which bear down thereon to provide crease lines 156 and 158 about which lines the side flaps 112 and 114 are to fold. The shells 50 then pass into a semicircular forming tube 160 whose leading edge 162 is scarfed so that flap lifting ramps 164 and 166 are formed facing the opposite sides of each burrito shell 50 which passes therethrough. This causes the flaps 112 and 114 to lift and fold over at the crease lines 156 and 158, as shown in FIG. 19, for contact with a pair of inwardly sloping ramps 168 and 170 which bear down on the flaps 112 and 114 to assure they fold flatly on the shells 50. The belt 51 then carries the shells 50 between a plurality of side forming rollers 172 which contact the shells 50 and further assure their proper shape. Thereafter, the shells 50 are transferred by means of the blade 104 and rotating rod 106 to the third belt 96, as discussed regarding the mechanism 88, wherein the final rolling operation is completed.

Thus there has been shown and described a novel machine for forming burritos which fulfills all the objects and advantages sought therefor. Many changes, modifications, variations, uses and applications of the subject invention will however become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A machine to form burritos from a flexible tortilla of a general diameter with first and second side portions, a leasing edge, a trailing edge, an upper surface, a lower surface, and filling material positioned on the upper surface adjacent teh leading edge, said machine including:
   a belt moving in a predetermined direction having a tortilla thereon with burrito filling on the tortilla and the leading edge of the tortilla folded over the burrito filling, said belt having:
      opposite side edges;
   first and second ramps positioned to lift the first and second side portions of said tortilla as the tortilla moves with said belt, said first and second ramps extending along opposite sides of said belt and the tortilla extending beyond said sides of said belt for lifting thereby;
   means to fold the lifted first and second side portions of said tortilla over the burrito filling as the tortilla moves with said belt including:
      a first slide bar extending inwardly from said first ramp positioned to contact the first side portion to fold the first side portion over the filling; and
      a second slide bar extending inwardly from said second ramp positioned to contact the second side portion after said first slide bar has contacted the first side portion to fold the second side protion over the filling; and
   means to roll the tortilla so that its leading edge is covered by the trailing edge thereof.

2. The machine as defined in claim 1 further including:
   means to crease the tortilla on opposite sides of the burrito filling as the tortilla moves with said belt including:
      a first V shaped rod member having:
         first and second generally parallel ends; and
         bias means to force said first and second generally parallel ends thereof down onto said belt and any tortilla moving thereon, said parallel ends extending adjacent said first and second slide bars to restrict folding of the first and second side portions of the tortilla thereabout.

3. The machine as defined in claim 2 further including:
   a second V shaped rod member positioned to contact a tortilla after creasing by said first V shaped rod member having:
      first and second generally parallel ends positioned to assure folding of the first and second side portions of the tortilla thereabout.

4. The machine as defined in claim 2 wherein said belt includes:
   upstanding transverse ridges positioned to make frictional contact with the lower surface of the tortilla.

5. The machine as defined in claim 4 wherein said means to roll the tortilla so that its leading edge is covered by the trailing edge thereof, include:
   curtain means positioned over said belt to make frictional contact with tortillas moving therewith.

6. The machine as defined in claim 5 wherein said curtain means include:
   transverse ribs parallel to and facing said transverse ridges; and
   a plurality of biased members urging said curtain means toward said belt.

7. The machine as defined in claim 5 further including:
   a large diameter wheel on which a portion of said belt is supported adjacent said curtain means, said curtain means being positioned so that a tortilla moves from generally horizontal to generally vertical as it is being rolled between said belt and said curtain means.

8. A machine to form burritos from flexible tortillas, each of a general diameter with first and second side portions, a leading edge, a trailing edge, an upper surface and a lower surface, and filling material, said machine including:
   a first belt formed in a first elongated horizontal loop, said first belt having:

a width greater than the general diameter of the tortilla for carrying the tortillas therewith, and said first loop having:
  a first end; and
  a second end positioned generally horizontally from said first end of said first loop;
means for driving said first belt to move in said first loop;
means for supplying the burrito filling on the upper surfaces of the tortillas adjacent their leading edges as they move with said first belt;
a second belt formed in a second elongated horizontal loop, said second belt having:
  a width greater than the general diameter of the tortilla for carrying the tortillas therewith, and said second loop having:
  a first end closely adjacent said second end of said first loop; and
  a second end positioned generally horizontally from said first end of said second loop;
means for driving said second belt to move in said second loop;
means to transfer tortillas from said second end of said first loop to said first end of said second loop; and
tortilla leading edge folding means positioned between said means to transfer tortillas from said second end of said first loop to said first end of said second loop and said second belt at said first end of said second loop, said tortilla leading edge folding means including:
  a supporting fixedly positioned above said first and second loops; and
  a plate hingedly connected to said support with a lower edge portion extending downwardly between said means to transfer tortillas from said second end of said first loop to said first end of said second loop and said second belt at said first end of said second loop, said plate being positioned across the path of the tortillas as they transfer from said first loop to said second loop, said plate hanging freely at an angle with its lower edge portion canted toward said first loop, whereby the leading edge of the tortillas contact said plate and ride thereup to fold over the filling before said plate swings back to allow transfer to said second loop.

9. The machine as defined in claim 8 wherein said plate is an L shaped plate in cross-section.

10. The machine as defined in claim 8 wherein said support includes:
stop means positioned toward said first loop from said plate and positioned to restrict swinging movement of said plate toward said first loop.

11. The machine as defined in claim 8 further including:
a curtain positioned above said second loop in position to apply downward force to the leading edges of the tortillas after they have been folded by said tortilla leading edge folding means.

12. The machine as defined in claim 8 wherein said means to transfer tortillas from said second end of said first loop to said first end of said second loop include:
a spinning rod extending transversly between said first and second belts, said spinning rod having:
  a rough surface whose velocity is higher than the velocity of said first and second belts; and
  a diameter substantially less than the diameter of said second end of said first loop.

13. The machine as defined in claim 8 further including:
a third moving belt positioned adjacent said second end of said second loop, said third belt having:
  opposite side edges;
means to transfer the tortillas from said second end of said second loop to said third belt;
means positioned over said third belt to crease the tortillas on opposite sides of the burrito filling as the tortillas move with said third belt;
first and second ramps positioned to lift the first and second side portions of the tortillas as the tortillas move with said third belt;
means spaced from said first and second ramps to fold the lifted first and second side portions of the tortillas over the burrito filling as the tortillas move with said third belt; and
means to roll the tortillas so that their leading edges are covered by the trailing edges thereof.

14. The machine as defined in claim 13 wherein said means spaced from said first and second ramps to fold the lifted side portions of the tortillas over the burrito filling as the tortillas move with said third belt include:
a first slide bar extending inwardly of said first ramp positioned to contact the first side portion to fold the first side portion over the filling; and
a second slide bar extending inwardly of said second ramp positioned to contact the second side portion after said first slide bar has contacted the first side portion to fold the second side portion over the filling without interference from said first side portion.

15. The machine as defined in claim 14 further including:
means to crease the tortillas on opposite sides of the burrito filling as the tortillas move with said third belt including:
  a first V shaped rod member having:
    a first and second gnerally parallel ends; and
    bias means to force said first and second generally parallel ends thereof down onto said third belt and any tortilla moving thereon, said parallel ends extending adjacent said first and second slide bars to restrict folding of the first and second side portions of the tortillas thereabout.

16. The machine as defined in claim 15 further including:
a second V shaped rod member positioned to contact tortillas after creasing by said first V shaped rod member having:
  first and second generally parallel ends positioned to assure folding of the first and second side portions of tortillas thereabout.

17. The machine as defined in claim 8 wherein said means to roll the tortillas so that their leading edges are covered by the trailing edges thereof include:
curtain means positioned over said third belt to make frictional contact with tortillas moving therewith.

18. The machine as defined in claim 17 further including:
a large diameter wheel on which a portion of said first belt is supported adjacent said curtain means, said curtain means being positioned so that tortillas move from generally horizontal to generally vertical as they are being rolled between said third belt and said curtain means.

19. The machine as defined in claim 18 wherein said third belt includes upstanding transverse ridges positioned to make frictional contact with the lower surfaces of the tortillas.

20. The machine as defined in claim 19 wherein said curtain means include:

transverse ribs parallel to said transverse ridges; and a plurality of biased members urging said curtain means toward said third belt.

21. A machine to form burritos from a flexible tortilla of a general diameter with first and second side portions, a leading edge, a trailing edge, an upper surface, a lower surface, and filling material positioned on the upper surface adjacent the leading edge, said machine including:

a belt moving in a predetermined direction having a tortilla thereon with burrito filling on the tortilla and the leading edge of the tortilla folded over the burrito filling and the first and second side portions folded over at least portions of the leading edge and the burrito filling; and means to roll the tortilla so that its leading edge is covered by the trailing edge thereof including:

curtain means positioned over said belt to make frictional contact with tortillas moving therewith; and a large diameter wheel on which a portion of said belt is supported adjacent said curtain means, said curtain means being positioned so that a tortilla moves from generally horizontal to generally vertical as the tortilla is being rolled between said belt and said curtain means.

22. The machine as defined in claim 21 wherein said curtain means include:

transverse ribs facing said belt; and a plruality of biased members urging said curtain means and transverse ribs toward said belt.

23. The machine as defined in claim 22 wherein said belt includes transverse ridges facing said curtain means.

24. The machine as defined in claim 21 wherein said curtain means include:

a plurality of biased members urging said curtain means toward said belt in the location thereof where a tortilla moves from generally horizontal to generally vertical as the tortilla is being rolled between said belt and said curtain means.

* * * * *